US010857969B2

(12) United States Patent
Battlogg

(10) Patent No.: US 10,857,969 B2
(45) Date of Patent: Dec. 8, 2020

(54) DEVICE AND METHOD FOR INFLUENCING THE FORCE OF A SEATBELT

(71) Applicant: INVENTUS ENGINEERING GMBH, St. Anton I.M. (AT)

(72) Inventor: Stefan Battlogg, St. Anton I. M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 0 days.

(21) Appl. No.: 15/768,617

(22) PCT Filed: Oct. 16, 2016

(86) PCT No.: PCT/EP2016/074824
§ 371 (c)(1),
(2) Date: Apr. 16, 2018

(87) PCT Pub. No.: WO2017/064316
PCT Pub. Date: Apr. 20, 2017

(65) Prior Publication Data
US 2018/0215342 A1  Aug. 2, 2018

(30) Foreign Application Priority Data
Oct. 15, 2015 (DE) .......................... 10 2015 117 595

(51) Int. Cl.
*B60R 22/34* (2006.01)
*F16F 9/14* (2006.01)
(Continued)

(52) U.S. Cl.
CPC ............ *B60R 22/341* (2013.01); *B60N 2/002* (2013.01); *F16F 9/145* (2013.01); *F16F 9/535* (2013.01);
(Continued)

(58) Field of Classification Search
CPC ......... B60R 22/341; F16F 9/145; F16F 9/535; F16F 9/537; F16F 15/18; F16F 15/161;
(Continued)

(56) References Cited

U.S. PATENT DOCUMENTS 4,534,441 A * 8/1985 Kamijo .................. B60R 22/44
180/268
6,481,659 B1  11/2002 Ashtiani et al.
(Continued)

FOREIGN PATENT DOCUMENTS

CN       1876448 A     12/2006
CN     102782358 A     11/2012
(Continued)

*Primary Examiner* — James A English
(74) *Attorney, Agent, or Firm* — Laurence A. Greenberg; Werner H. Stemer; Ralph E. Locher

(57) ABSTRACT

A device for influencing the force of a seatbelt acting on an occupant of a passenger vehicle during a collision, for example. The device includes a rotary damper with a magnetorheological fluid as a working fluid for damping a rotational movement of a damper shaft of the rotary damper when winding or unwinding the seatbelt. The rotary damper has a displacing device with displacing components which engage into one another and which are wetted by the magnetorheological fluid. By using a paired controller, a magnetic field of a magnetic field source with an electric coil can be controlled and the magnetorheological fluid can be influenced in order to adjust the damping of the rotational movement of the damper shaft.

22 Claims, 3 Drawing Sheets

(51) Int. Cl.
  *F16F 9/53* (2006.01)
  *B60N 2/00* (2006.01)
  *F16F 15/16* (2006.01)
  *F16F 15/18* (2006.01)

(52) U.S. Cl.
  CPC ............ *F16F 9/537* (2013.01); *F16F 15/161* (2013.01); *F16F 15/18* (2013.01); *F16F 2222/12* (2013.01); *F16F 2224/045* (2013.01); *F16F 2230/18* (2013.01); *F16F 2232/02* (2013.01)

(58) Field of Classification Search
  CPC ............... F16F 2232/02; F16F 2222/12; F16F 2224/045
  See application file for complete search history.

(56) References Cited

U.S. PATENT DOCUMENTS

| | | | |
|---|---|---|---|
| 6,655,743 B1 | 12/2003 | Parizat et al. | |
| 6,695,243 B2* | 2/2004 | Specht | B60R 22/3413 242/379.1 |
| 7,717,215 B2 | 5/2010 | Tanaka | |
| 7,828,331 B2* | 11/2010 | Jessup | B60R 22/3413 242/379.1 |
| 8,985,288 B2 | 3/2015 | Battlogg et al. | |
| 9,174,608 B2 | 11/2015 | Bedak et al. | |
| 2002/0113424 A1* | 8/2002 | Smith, Jr. | B60R 22/3413 280/806 |
| 2003/0079948 A1* | 5/2003 | Jolly | B62D 5/005 188/267 |
| 2003/0192977 A1 | 10/2003 | Specht | |
| 2005/0173581 A1* | 8/2005 | Stevens | B60R 22/4633 242/374 |
| 2010/0007125 A1 | 1/2010 | Jessup et al. | |
| 2011/0148071 A1* | 6/2011 | Battlogg | B60R 22/28 280/286 |
| 2015/0247548 A1* | 9/2015 | Battlogg | F16F 9/535 188/267.2 |
| 2016/0009158 A1* | 1/2016 | Baasch | F16F 15/0235 188/267.1 |
| 2018/0298976 A1* | 10/2018 | Battlogg | F16F 9/12 |

FOREIGN PATENT DOCUMENTS

| | | |
|---|---|---|
| DE | 19963580 A1 | 8/2001 |
| DE | 102009014999 A1 | 9/2010 |
| DE | 102010024420 A1 | 2/2011 |
| DE | 102009058064 A1 | 6/2011 |
| DE | 102014017787 A1 | 6/2016 |
| EP | 1352795 A2 | 10/2003 |

\* cited by examiner

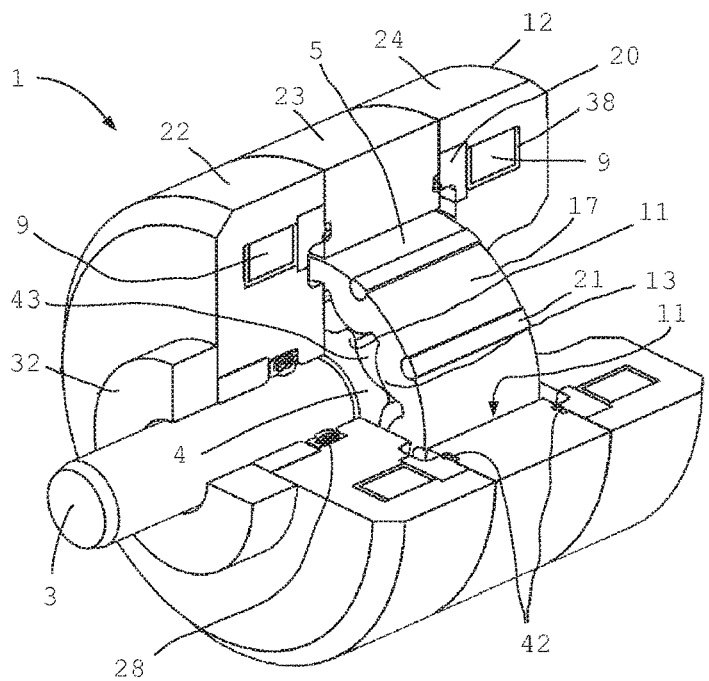
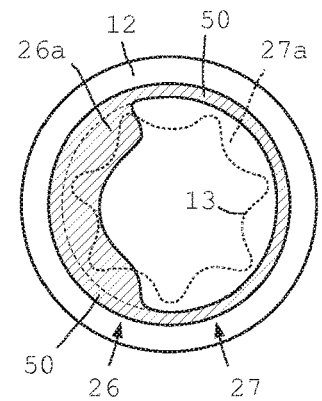
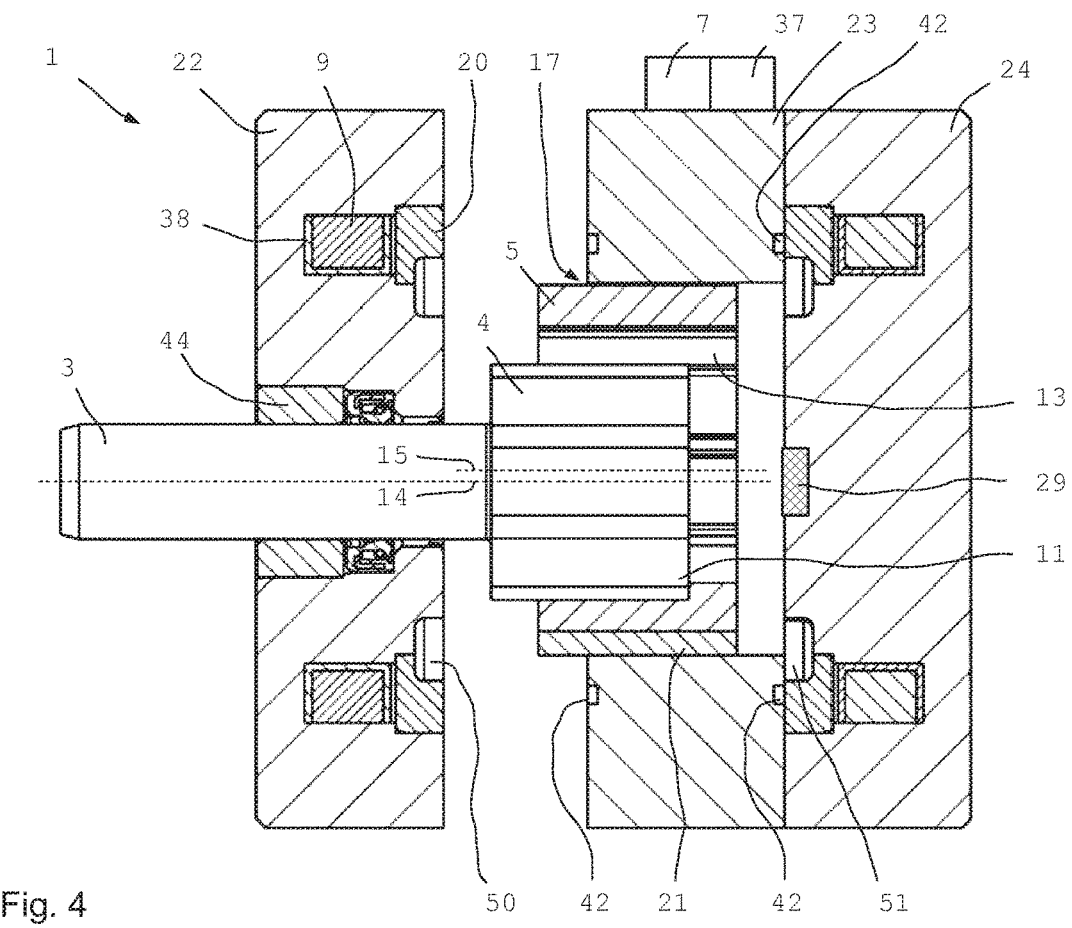
Fig. 3
Fig. 3b
Fig. 4

DEVICE AND METHOD FOR INFLUENCING THE FORCE OF A SEATBELT

BACKGROUND OF THE INVENTION

Field of the Invention

The present invention relates to an apparatus and a method for influencing the force of a safety belt on, for example, an occupant of a passenger transport means, for example in the event of a collision.

From the prior art, apparatuses and methods have become known with which the force of a safety belt acting on an occupant can be limited, for example in the event of a collision, in order to avoid possible injuries to the occupant resulting from an excessively high force of the safety belt. For this purpose, in the prior art, use is made, for example, of a torsion bar which, in the event of a collision, twists after the automatic tensioning of the safety belt and thus limits the maximum force acting on the occupant. Such systems function in an inherently reliable manner. A disadvantage thereof is however that the force profile cannot be influenced.

SUMMARY OF THE INVENTION

It is therefore the object of the present invention to provide an apparatus and a method for influencing the force of a safety belt on, for example, an occupant of a passenger transport means, with which more flexible influencing of the force profile is possible.

Said object is achieved by means of an apparatus as claimed and by means of a method as claimed. The dependent claims relate to preferred refinements. Further advantages and features of the present invention emerge from the general description and from the description of the exemplary embodiments.

An apparatus according to the invention for influencing the force of a safety belt on, for example, an occupant of a passenger transport means, for example in the event of or in particular in the event of a collision, comprises at least one rotary damper with a magnetorheological fluid as working fluid for damping a rotational movement of a damper shaft of the rotary damper during the winding-up or unwinding of the safety belt. In particular, the safety belt is wound up on and unwound from a belt roller. The rotary damper has at least one displacement device with displacement components which engage into one another, and which in particular rotate. The magnetorheological fluid is contained at least in the displacement device. The displacement components which engage into one another, and which in particular rotate, are wetted by the magnetorheological fluid, or the displacement components displace the magnetorheological fluid as working fluid. By means of an associated control device, a magnetic field of a magnetic field source which comprises at least one electrical coil can be controlled, and the magnetorheological fluid influenced, in order to set a degree of damping of the rotational movement of the damper shaft. It is thereby made possible in particular, during a winding process of the belt roller, for the winding-up or unwinding of the safety belt to be dampened in targeted fashion. Here, control which is variable over time, and which is also sensor-based, is also possible.

The apparatus according to the invention has numerous advantages. A major advantage of the apparatus according to the invention consists in that, by means of a control device, a magnetic field of an electrical coil is controlled in targeted fashion in order to thereby influence the magnetorheological fluid in targeted fashion.

The particles, which are composed for example of carbonyl iron powder, in the magnetorheological fluid interlink under the influence of a magnetic field. The intensity of the interlinking is dependent on the intensity of the magnetic field. It is thus possible to react to changing external conditions in a flexible manner at all times, and to set the force of a safety belt in real time. A magnetorheological fluid reacts within 1 ms or within a few milliseconds (<5 or less than 10 or less than 20 ms), such that it is generally possible to react adequately quickly in the event of a collision.

The apparatus according to the invention may also be referred to as a belt force setting device or as a belt force limiter.

In the context of the present invention, the expression "rotary damper" means that parts of the rotary damper must rotate relative to one another during damping operation. This means that the displacement components wetted with the magnetorheological fluid rotate relative to one another during damping.

The magnetorheological fluid is contained as working fluid in the displacement device. The displacement components are directly wetted by the magnetorheological fluid and are in direct contact with the magnetorheological fluid. This means that the displacement components displace the magnetorheological fluid as working fluid. The displacement device may be designed as a compressor, pump or toothed-gear pump, wherein the individual displacement components may be designed for example as toothed components, toothed gears or spindle screws or other helically toothed components. Other intermeshing outer and inner contours are also possible. The displacement components that engage with one another mesh in particular with one another.

In all embodiments, it is possible for the magnetic field source or at least one magnetic field source to have at least one additional permanent magnet. A permanent magnet of said type generates a magnetic field which is constant over time, which may have a magnetic field of the electrical coil superposed thereon, and which can thus be modulated, in order to reduce or intensify the effectively acting magnetic field. This makes it possible for a basic force to be predefined by means of the permanent magnet, wherein said basic force is for example maintained even in the event of a failure of the electrical systems.

In preferred refinements, a first displacement component of the displacement components is fixedly connected to the damper shaft. A second displacement component of the displacement components is accommodated rotatably in a housing of the displacement device. Here, in particular, the first displacement component is in engagement with the second displacement component and is arranged eccentrically with respect to the second displacement component. This means that the axis of rotation of the first displacement component is arranged eccentrically with respect to the axis of rotation of the second displacement component. The damper shaft is preferably accommodated at least in sections in a housing of the rotary damper. The housing of the rotary damper is preferably also the housing of the displacement device, and may be composed of one housing part or of multiple parts.

In preferred embodiments, the first displacement component has an external toothing, and the second displacement component has an internal toothing. Here, the second displacement component is in particular accommodated (freely) rotatably in the housing. In these cases, the first displacement component may also be referred to as inner displacement component, and the second displacement component may be referred to as outer displacement component.

It is preferable if an interior space of the rotary damper can be exposed to a major part of the magnetic field of the magnetic field source. Here, the magnetorheological fluid is contained, at least in part, in the interior space of the rotary damper and in particular of the housing of the rotary damper. In this way, the magnetic field of the magnetic field source acts directly on the magnetorheological fluid contained in the interior space of the rotary damper, such that the magnetorheological fluid, as working fluid, influences a rotational movement of the displacement components wetted with the magnetorheological fluid.

In advantageous embodiments, the rotary damper comprises at least one damping channel which can be exposed to the magnetic field of the magnetic field source. In particular, the rotary damper comprises at least one damping channel in the interior of the housing of the displacement device or of the rotary damper. A damping channel arranged in the interior permits a particularly compact construction and design and thus action of the magnetic field on the magnetorheological fluid contained in the damping channel. The damping channel may be formed as a damping gap or may comprise at least one such damping gap.

In preferred refinements, a damping gap as a damping channel is arranged radially between the second displacement component and the housing. Multiple damping gaps are also possible. It is particularly preferably possible for the damping gap to be formed as a type of ring-shaped gap or ring-shaped channel which extends radially between the second displacement component and the housing, in particular around the second displacement component. Here, the damping gap may be divided into multiple segments. The damping gap or at least one damping gap can preferably have the magnetic field applied thereto in targeted fashion.

In preferred refinements, the damping gap can be exposed to at least a major part of the magnetic field of the magnetic field source. This means that the magnetic field or the magnetic field lines of the magnetic field pass to a major extent through the damping gap and thus act in an effective manner on the magnetorheological fluid contained in said damping gap. By means of a variation of the magnetic field acting on the damping gap, it is thus possible in an effective manner to influence the maximum force exerted on an occupant by the belt.

In advantageous refinements, the second displacement component is guided rotatably in the housing by means of a multiplicity of guide units in order to ensure a defined damping gap between the second displacement component and the housing. The second displacement component is in particular formed substantially as an externally cylindrical part which, internally, is of hollow form and has an internal toothing there which meshes with the external toothing of the first displacement component. By means of the multiplicity of guide units, the second displacement component is guided in a defined manner in the housing, and a defined radial extent of the damping gap is ensured. Here, it is possible for the damping gap, which is formed for example as a ring-shaped gap, to be divided by the guide units into multiple gap segments or angle segments.

The guide units may be formed as slide units or as bearing units, and in particular are arranged so as to be distributed uniformly or at least substantially uniformly or symmetrically over the circumference. The guide units may each be formed of a type of sliding block and may be composed of brass, bronze or the like. The guide units may for example be of approximately cylindrical form, wherein a and in particular the radially outer side may be relatively intensely flattened in order to be better adapted to the inner contour of the housing.

Such guide units ensure defined conditions in the damping gap and have no effect, or have only a very moderate effect, on the basic friction. The displacement components rotate in particular during operation.

In advantageous embodiments, the housing has a first and a second end region and, in between, a central region. Here, an electrical coil is accommodated in at least one of the two end regions. An axis of the coil is in particular oriented substantially parallel to the damper shaft. The axis of the coil may for example be an axis of symmetry of the coil, or may for example be oriented perpendicular to a cross-sectional area of the coil. It is preferable for at least one end region to have a damper shaft which is accessible there and which is in particular led out thereof. In preferred refinements, the damper shaft is led out of the housing, or accessible, only at one end region. It is possible and preferable for each end region to be a separate part such that, in preferred embodiments, the housing is composed of a first end part and a second end part and possibly a central part arranged in between (or two or more central parts or housing parts in between).

In particularly preferred refinements, the housing is composed at least to a major extent, and in particular substantially or almost entirely or entirely, of a magnetically conductive material with a relative permeability of greater than 100. In particular, the relative permeability is greater than 500, and particularly preferably greater than 1000.

It is particularly preferable for the housing to comprise housing sections which adjoin the displacement components. The housing sections are arranged on the face sides of the displacement components (opposite one another) and each axially adjoin the (lateral ends of the) displacement components, or are separated from the displacement components by a small axial gap. The axial gap extends in a radial direction. The axial gap preferably has a width in an axial direction which is greater than a typical size of the largest (carbonyl iron) particles within the magnetorheological fluid (MRF). It is thereby ensured that jamming, seizing or the like of the displacement components on the housing section does not occur because (iron or carbonyl iron) particles that ingress into the axial gap have a smaller outer diameter than the gap width. The axial width of the axial gap is preferably greater than 5 μm and in particular greater than 10 μm or than 20 μm.

It is particularly preferable for at least one of said housing sections to be composed of a magnetically conductive material in the region of the axial gap.

It is preferable for a ring composed of a material with a relative permeability of less than 10 to be arranged axially adjacent to the electrical coil in the housing. The ring is in particular arranged axially between the electrical coil and the displacement components. It is particularly preferable for the ring and/or the electrical coil to be situated substantially or almost entirely or entirely radially further to the outside than the axial gap situated between the displacement component and the housing section. Here, "almost entirely" is to be understood to mean that the fraction radially outside amounts to more than 80% and in particular more than 90%. The ring is particularly preferably situated axially adjacent to, and so as to adjoin, a central part of the housing. The relative permeability of the ring material is particularly preferably less than 5 and preferably less than 2. Thus, the ring is composed practically of a magnetically non-conductive material. Suitable materials may for example be austenitic steel. The ring composed of a material with a low magnetic permeability prevents a magnetic short-circuit. The ring may be of unipartite or multi-part form. A further possibility is multiple rings which are provided parallel to one another or so as to be nested one inside the other. It is also possible for the ring to constitute a cavity which is filled for example with a medium such as air. It is also possible for the ring to be composed, in a circumferential direction, of multiple segments which are for example separated from one another by thin walls. Depending on the wall thickness of the wall, it is possible for said walls to be produced from a material with a greater permeability, as long as it is ensured overall that a magnetic short circuit is prevented.

It is preferable if a major part of the magnetic field of the magnetic field source passes through a or the axial gap between the housing and at least one of the displacement components. This means that the axial gap is exposed to the magnetic field. In this way, the axial gap between the displacement component (the displacement components) and the housing can also be used for influencing the force of the belt. An axial gap of said type is generally necessary from a construction aspect in order that a rotation of the displacement components relative to the housing is made possible with a low closure action and/or low friction. Through the use of the magnetic field, the axial gap can also be used for generating the desired torque of the. Furthermore, a pressure loss within the axial gap as a result of overflowing magnetorheological fluid is prevented.

In all embodiments, it is preferable for the magnetorheological fluid to be conveyed from an inlet of the displacement device to an outlet of the displacement device by means of rotational movement of the displacement components which engage into one another. Here, it is possible for at least one pressure sensor to be connected to the inlet and/or to the outlet. It is particularly preferable for the damper shaft to be led out of the housing at the inlet side, that is to say the suction side. At least one seal is preferably provided between the damper shaft and the housing. The damper shaft may be mounted on the housing.

In all embodiments, it is possible for the inlet and the outlet to be situated on the same side. If small or even extremely small channels or inaccuracies are present, however, an overflow across the small intermediate web may occur. It is therefore more expedient for the openings for inlet and outlet to be positioned on different face sides, even if the remaining axial gaps are sealed by means of the magnetorheological fluid (MRF). It is preferable for the axial gaps at both face ends to be sealed by means of the magnetorheological fluid (MRF).

In an advantageous refinement, the inlet and the outlet are arranged on different axial sides of the displacement device. In this way, a spatial separation of inlet and outlet is realized, which facilitates the sealing and is effective in preventing pressure losses as a result of an undesired and sealed passage of the displaced magnetorheological fluid from the outlet to the inlet. A conventional construction is however also possible, in which the inlet and the outlet are arranged on the same axial side of the displacement device, wherein the inlet and the outlet are for example of kidney-shaped form, and corresponding sealing measures are implemented between the inlet and the outlet. In the case of such an embodiment, at least one external damping channel outside the displacement device is preferred.

The magnetic field is preferably configured to be weaker in a region of the inlet than in a region of the outlet. Suitable construction measures may be implemented for this purpose. By means of a relatively weak magnetic field in the region of the inlet, that is to say on the suction side, cavitation within the magnetorheological fluid can be prevented even more effectively.

In advantageous refinements of all embodiments, it is preferable for a type of clutch to be provided functionally between the rotary damper and the belt roller. The clutch may for example be in the form of a centrifugal clutch, or may be based on some other operating principle. In this way, in the case of slow movements of the safety belt, only a low actuating force is necessary, whereas, in the case of fast movements of the safety belt, the clutch engages, and the rotary damper is thus activated.

In all embodiments, it is preferable for at least one equalization volume to be provided for permitting, for example, a temperature equalization. The equalization volume may be composed for example of an air bladder or some other compressible material. The equalization volume is preferably arranged on the intake side, because a relatively low pressure level prevails there. The magnetic field may be relatively weak on the intake side in order that no cavitation occurs during the intake process. Although a closed circuit is involved, this increases reliability in the event of temperature changes and expansions.

It is preferable for at least one external damping valve with a valve channel as damping channel to be provided. The external damping valve may provide an additional damping channel. It is however also possible for the single damping channel or the single damping channels to be formed on the external damping valve. An external damping valve offers greater freedom in terms of construction. A rotary damper without an external damping valve offers a compact structural form and an inexpensive construction.

It is preferable for at least one angle sensor to be provided which detects a value for an angle position of the damper shaft. An angle sensor of said type may be formed for example as an absolute rotational angle sensor. Other sensor types (e.g. force sensors, acceleration sensors . . . ) are also possible.

In all embodiments, it is possible for the rotary damper to be coupled to an electric motor for unwinding and/or winding up the safety belt. In all cases, the use of an auxiliary gearing is also possible.

In all embodiments, it is possible for the rotary damper to be arranged at any desired belt diversion point (for example in the B pillar at shoulder height; upper edge of the seat bench in the vehicle rear). In all cases, the use of an auxiliary gearing or of a non-positively locking or positively locking connection to the belt is also possible.

By means of an electric motor, the safety belt can be pretensioned for example also in the event of a collision. Also possible, however, is the use of other pretensioning mechanisms, such as for example the use of a suitable explosive charge, in order to achieve effective pretensioning of the safety belt in the event of a collision, or of a thermal actuator (shape memory). A very considerable advantage is that the electric motor only has to be capable of imparting a torque much lower than that which the rotary damper has to be capable of braking. In this way, an electric motor can be used which is coupled, possibly via an auxiliary gearing, directly to the rotary damper. The electric motor and also the auxiliary gearing may be of inexpensive design, because they are designed for low loads. By contrast, the rotary damper is suitable for considerably higher braking torques, and may likewise be realized inexpensively. The overall costs that are incurred are much lower than in the case of a design with an electric motor that can perform the winding-up and also the braking.

In particular in the case of an electric motor being used, it is also possible for at least one external hydraulic actuator to be arranged so as to be fluidically connected to the displacement device. An actuator of said type can be deployed or retracted, for example, by actuation of the displacement device that acts as a pump. It is for example possible for a preload by means of a spring to be realized at least in one direction of action, such that a restoring movement can take place automatically.

In all embodiments, it is preferable for at least one occupant sensor to be provided for detecting at least a position and/or a weight and/or a physical build and/or an age of an occupant. The control device is preferably designed and configured to control the rotary damper in a manner dependent on the at least one detected measurement variable. For example, an occupant sensor may detect a distance to fixtures in the interior space of a motor vehicle, and, in a manner dependent on the determined distance, correspondingly set the force of the safety belt such that, on the one hand, the available distance is sensibly utilized, while on the other hand, the load exerted on the occupant by the safety belt is reduced. The weight of an occupant is preferably also taken into consideration.

The method according to the invention serves for influencing a force of a safety belt on, for example, an occupant of a passenger transport means, in particular in the event of a collision. Here, a value for a load exerted on the occupant by the safety belt is determined, and subsequently, in a manner dependent on the determined value, a magnetic field of a magnetic field source is set in a damping channel, which has a magnetorheological damping fluid as working fluid, of a rotary damper. In this way, a rotational movement of a damper shaft of the rotary damper during the winding-up or unwinding of the safety belt can be damped.

The method according to the invention also has numerous advantages, because it permits individual influencing, in real-time, of the force of a safety belt on an occupant. Here, the force of the safety belt can be set within a few milliseconds (less than 5 or 10 or 20 ms).

In all embodiments, the gap dimensions in the displacement device are preferably larger than in the case of conventional displacement devices from the prior art which are not operated with a magnetorheological fluid as working fluid. Accordingly, an axial gap between the rotating displacement components and the housing of the displacement device may for example be >0.02 mm, and in preferred embodiments may be 0.03 mm. The radial gap between the second displacement component or the outer displacement component and the inner circumference of the housing of the displacement device may be >0.05 mm, and lies in particular between approximately 0.05 mm and 0.5 mm, preferably between approximately 0.01 mm and 0.4 mm. Good results have been obtained with a gap of approximately 0.25 mm. It is preferable for each gap to be larger than 0.01 mm and preferably larger than 0.015 mm and in particular larger than 0.02 mm.

By means of the magnetic field of the magnetic field source, it is preferable for a major part of the gaps contained to be magnetized, such that the iron particles of the magnetorheological fluid there are aligned and can perform an additional sealing action and additional damping.

The force profile can be set in continuous, variable and very rapid fashion by means of the current of the electrical coil. The entire magnetization may already occur in the displacement device itself. A particularly space-saving construction is then possible. The continuous closed-loop control of the valve units may be performed from 0 to 100% in the range of a few milliseconds, whereby high system dynamics are made possible.

In one specific embodiment, it was possible with an electrical power of just 3 W to obtain a braking torque of 20 Nm with a current intensity of 1.1 A. With corresponding scaling, much greater torques can be achieved.

In all embodiments, the displacement device and in particular the first and second displacement components are produced from a magnetically conductive material such as for example ST37 or 5235. If the displacement components are formed as toothed components, then the number of teeth of the inner displacement component is preferably smaller than the number of teeth of the outer displacement component. A difference of one tooth between the inner and the outer displacement components is possible and preferred.

It is possible for the intermeshing components, or the components that are subjected to increased load, to be formed so as to be harder, for example by means of hard chromium layers or other surface layers or by means of an increase of the surface hardness, in order to realize a longer service life.

A considerable advantage of the invention also consists in that the number of rotations of the rotary damper is basically unlimited. Whereas, in the case of a torsion bar from the prior art, only a limited number of rotations is possible in order to limit the belt force, it is basically possible in the case of the invention for an unlimited number of rotations of the rotary damper to take place, in order to optimally set the force of the safety belt at any point in time. It is thus possible for practically the entire belt travel to be enabled if this appears expedient in the collision situation.

By virtue of consideration being given, for example, to the weight or to the physical build of the occupant, it is possible to react individually to the characteristics of the occupant, such that the available maximum travel can be optimally utilized.

It is thus possible for the restraining force exerted on the occupant by the safety belt to be reduced at all times to the biomechanically bearable limit values by means of the apparatus according to the invention. In this way, it is for example possible for rib fractures to be prevented, or it can be ensured that the head flexion angle does not overshoot certain limit values, if this is at all possible in the collision situation. By means of the invention, adapted restraining forces can for example reduce the loads on the occupant in the head and chest area. The invention makes it possible to realize an adaptive restraint system of the safety belt, which can for example be configured differently for driver and front passenger, because a greater forward displacement travel is generally available on the front passenger side owing to the absence of a steering wheel.

In specific embodiments, forces in the range from 2000 Nm to 6000 Nm may be required on the safety belt, which requires moments of up to 100 Nm at the belt retractor. Here, high rotational speeds of up to 6000 revolutions per minute may occur.

Conventional magnetorheological clutches from the prior art cannot handle these rotational speeds, because in this case, the magnetorheological fluid would be centrifuged into its constituent parts. Here, the magnetorheological fluid operates directly as working fluid. A risk of centrifuging does not arise.

By virtue of the fact that relatively large gaps in a radial and an axial direction are possible in the displacement device, a further advantage is achieved, because the basic friction in the absence of a magnetic field is considerably lower than in the case of conventional displacement devices which are operated with a hydraulic oil. In these, no gaps are used, in order to avoid pressure losses. In the case of the displacement device of the present invention, the gaps that have the magnetic field applied thereto in an axial and a radial direction are selected to be larger, because automatic sealing and interlinking of the magnetorheological particles occurs. In this way, when a magnetic field is applied, a high braking torque is generated, whereas, after deactivation of the magnetic field or after reduction of the magnetic field, only very low basic friction is present owing to the large gap dimensions. The axial gaps and in particular also the radial gaps are traversed, preferably transversely with respect to the longitudinal extent thereof, by a major part of the magnetic field. In particular, the magnetic field runs, at least to a major extent, approximately perpendicular or perpendicular to the longitudinal extent of at least one axial gap and/or of at least one radial gap.

The apparatus is preferably used to tighten the safety belt in the event of a collision. For this purpose, the safety belt is tightened by up to 15 cm or even 30 cm within a short time of approximately 5 ms to 20 ms. This is expedient in particular if thick clothing prevents the belt from lying taut against the body. Here, the belt tightening may for example be integrated in the belt retractor or on the belt roller. An arrangement below the belt buckle and/or at the anchoring of the safety belt to the vehicle body is also possible. A stressed spring or a small explosive charge, for example, may be used as an energy source. Tensioning by means of an electric motor is also possible. It is preferable for the time duration for establishing a certain magnetic field to be <100 ms and in particular <20 ms and preferably less than 10 ms. It is preferably the case that no separate cooling arrangement is required for the apparatus. In particular, it is possible for the apparatus to be underdimensioned, because continuous operation of the belt roller is generally not provided.

In all embodiments, there is preferably a closed circuit for the magnetorheological fluid. The closed circuit may be present within the displacement device. It is however also possible for a fluid line to be led out of the interior of the displacement device, to be led via a valve, and to be led back into the displacement device. A rotational movement of the belt roller is dampened or braked by means of the rotary damper.

In all embodiments, it is possible for pressure fluctuations caused by the operation of the displacement device to be technically compensated by means of the controller by virtue of the magnetic field being correspondingly controlled over time. This is possible because the magnetorheological fluid reacts to magnetic field changes in an extremely short time.

It is possible and preferable for the safety belt to also be pretensioned by means of the rotary damper if, for example, an explosive charge, an electric motor or a pressure vessel as pressure accumulator is included. Here, the preload force can be varied by means of the rotary damper. The preload is preferably selected such that this is possible multiple times (in succession) (pre-safe).

In all embodiments, the pressure fluctuations generated by the displacement device can be smoothed by means of closed-loop control of the magnetic field intensity of the magnetic field source. Such pressure fluctuations may arise because there is not a constant volume flow through the toothed profile of the displacement components.

It is preferable for the device to be networked with a computer such as for example the on-board computer in order for data to be exchanged between different restraint systems, preferably in real-time and during the accident (crash), for settings to be logged or for settings to be implemented (for example adaptation of the airbag ignition point or of the airbag intensity, for example in a manner dependent on the present situation during the crash/collision). An update over a secured network or over the Internet is possible. It is thus possible for new characteristic curves to be installed.

The invention provides an apparatus for influencing the force of a safety belt, by means of which the force profile can be continuously, variably and very quickly controlled in closed-loop fashion by means of the current.

Further advantages and features of the present invention will emerge from the description of the exemplary embodiments, which will be discussed below with reference to the appended figures.

BRIEF DESCRIPTION OF THE SEVERAL VIEWS OF THE DRAWING

In the figures:

FIG. 3 shows a partial section through the rotary damper of the apparatus as per FIG. 1;

FIG. 3b shows a schematic plan view of an end region of the housing of the rotary damper as per FIG. 1;

FIG. 4 shows an exploded illustration of the rotary damper from FIG. 3;

DESCRIPTION OF THE INVENTION

Figure 1:
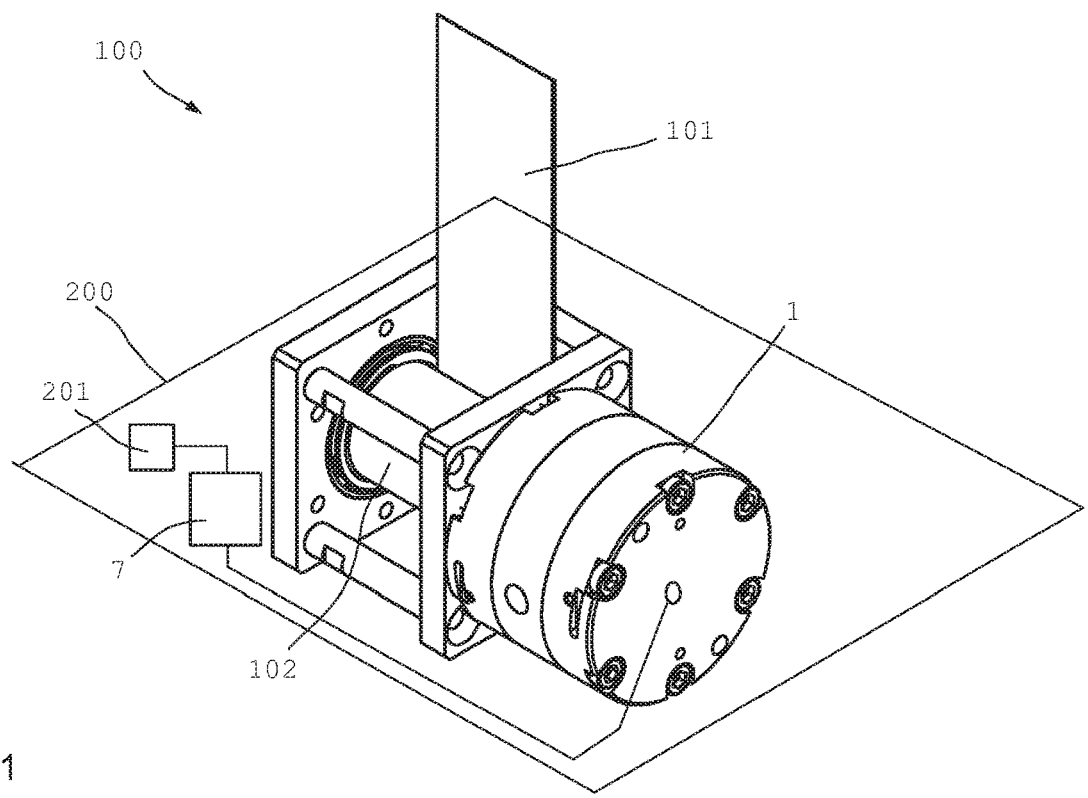
FIG. 1 shows a schematic perspective view of an apparatus according to the invention.

FIG. 1 shows a schematic perspective illustration of an apparatus 100 according to the invention which is fastened to a passenger transport means 200. The apparatus 100 in this case comprises a belt retractor with a belt roller 102, on which a safety belt 101 is rolled up. For the setting of the force exerted on an occupant by the safety belt 101, the rotary damper 1 is provided, which is controlled by means of an internal or external control device 7. The control device 7 may have internal sensors, and may also be connected to external sensors 201. An external sensor 201 of said type may for example be an occupant sensor, which detects characteristics of the occupant or the present position of the occupant, etc. In a manner dependent on the sensorially detected data, at least in a collision situation, a braking torque at the rotary damper 1 is set in order to set the belt force on an occupant as desired.

Figure 2:
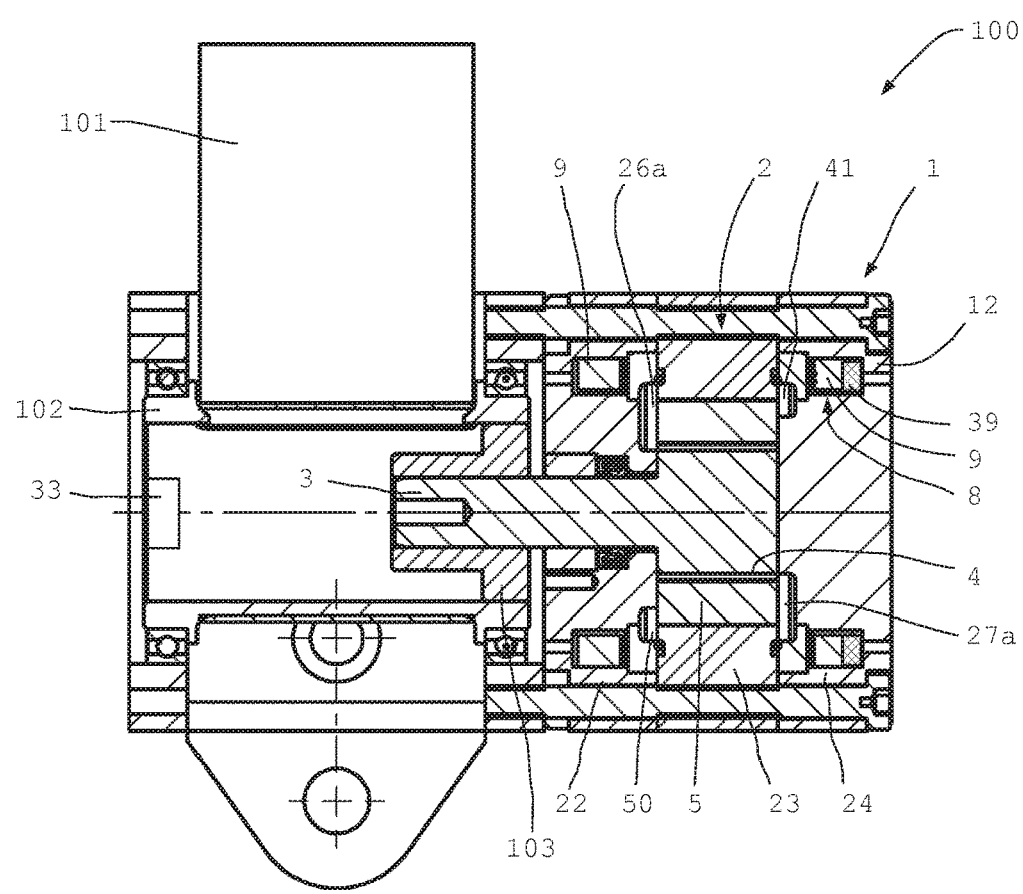
FIG. 2 shows a section through the apparatus as per FIG. 1.

FIG. 2 shows the apparatus 100 from FIG. 1 in section. The apparatus 100 comprises the rotary damper 1 and the belt retractor with the belt roller 102. On the belt roller 102 there may for example be arranged a load sensor 33 which detects a value for a load of the safety belt 101 on an occupant, such that the control device 7 can set a suitable braking torque in a manner dependent also on the measurement data from the load sensor 33.

The rotary damper 1 has a housing 12 which, in this case, is part of the displacement device 2 or forms the housing thereof. In the interior of the displacement device 2 there is arranged a damper shaft 3 which is couplable to the belt roller 102 by means of a clutch 103. During normal driving operation of a passenger transport means 200 in the form of a motor vehicle, the clutch 103 may permit a free rotational movement of the belt roller 102 in order to provide a low actuation force. In the event of a collision, the clutch 103 engages, such that the rotary damper 1 is coupled rotationally conjointly to the belt roller 102.

Here, the damper shaft 3 is fixedly coupled to the first or inner displacement component 4, and in this case is manufactured in one piece therewith. The first displacement component 4 has an external toothing 11 which meshes with an internal toothing 13 of the second displacement component 5.

The second displacement component 5 has a substantially cylindrical external shape and is received in the housing 12. Here, both displacement components 4 and 5 extend over the same axial width.

At least one magnetic field source 8 which comprises an electrical coil 9 is arranged in the housing 12. Here, two electrical coils 9 are provided in the housing, the magnetic fields of which coils serve for influencing the magnetorheological fluid present in the interior of the displacement device. Here, both face-side axial gaps 25 are sealed by means of the magnetic fields of the electrical coils 9.

It is also possible for a permanent magnet 39, for example, to also be provided in addition to a (or each) electrical coil 9, which permanent magnet generates a static magnetic field that can be modulated by means of the electrical coil 9.

To prevent a failure of the system for example in the event of an electrical failure, an electrical capacitor or some other local energy source or an energy store may be provided on or in the rotary damper or on or in the apparatus 100. It is thus possible for sufficient energy for ensuring reliable functioning of the apparatus 100 to still be stored even in the event of a failure of the electrical systems of the passenger transport means.

It is also possible for the magnetic field of a permanent magnet 39 to be dimensioned to be of such an intensity that, even in the event of a failure of the local electrical components, an adequately high braking torque at the apparatus 100 is provided such that an adequately intense restraining force of the safety belt 101 in the event of a collision is achieved. By means of the electrical coil 9, a correspondingly oppositely polarized magnetic field (or co-directional magnetic field) can be set in order to model the overall acting magnetic field of the magnetic field source 8. In this way, it is possible at all times for an optimum magnetic field to be set and for the magnetic field of the permanent magnet 39 to be intensified or weakened in targeted fashion.

FIG. 3 shows a partial section of the rotary damper 1 from FIG. 2, wherein the external toothing 11 of the first displacement component 4 and the internal toothing 13 of the second component 5 can be seen.

It can also be seen here that the housing 12 of the rotary damper 1 comprises three sections, specifically a first end region 22, a central region 23 and a second end region 24. Here, each region is formed by a separate part. It is also possible for an even greater number of parts to be provided, or for a total of only two housing halves to be provided.

In the housing 12, in each case one electrical coil 9 is accommodated, in each case in a coil holder 38, in the in this case left-hand end region 22 and in the in this case right-hand, second end region 24.

A ring 20 is provided axially adjacent to each electrical coil 9, wherein the rings 20 are arranged between the two coils 9 and, in this case, adjoin the central region 23 in each case from the outside. The rings 20 are arranged axially adjacent to the electrical coils 9 in order to prevent a magnetic short-circuit there, as will be discussed in more detail below with reference to FIGS. 4 and 5.

On the damper shaft 3 there is provided an angle sensor 32, which may for example be designed as an absolute rotational angle encoder. The damper shaft 3 is sealed in the direction of the interior space 16 by means of a seal 28. Between the housing parts of the different regions, there are arranged encircling seals 42 for preventing the escape of magnetorheological fluid from the interior space of the displacement device 2 in this case radially outward through the interfaces between the parts 22, 23 and 24.

The second displacement component 5 with an altogether approximately cylindrical external shape has multiple guide units 21 on the outer circumference, which guide units extend over the entire axial length in the exemplary embodiment here, though may for example also be of shorter form in other embodiments. The guide units 21 project radially outward beyond the second displacement component 5 or the core material of the second displacement component 5 outward, and ensure a defined radial spacing between the outer surface of the core material of the second displacement component 5 and the inner circumference of the housing 12 at the central region 23.

FIG. 3b shows a highly schematic plan view of an end region 22 or 24 of the housing 12 of the rotary damper 1 as per FIG. 1, wherein the internal construction of the rotary damper 1 and the flow guidance is made clearer. The drawing shows, for example, the end region 22 in a plan view from the inside, but without the displacement component 4. The inner contour 13 of the outer displacement component 5 is shown by dashed lines, and may have a greater or lesser number of teeth in different embodiments. Here, a circumferential groove 50 is provided in the end region 22 (and 24) radially outside the radially outermost tooth contour of the displacement components 4 and 5, which circumferential groove extends in fully encircling fashion around the axis in the end region 22 (and 24). Said circumferential groove 50 serves as a collecting (50) or distributing channel (51) for the MRF. The circumferential groove may however also extend only over partial regions of the circumference.

On the in this case left-hand side in the drawing, a kidney-shaped suction port 26a is formed on the suction side 26 or at the inlet, through which kidney-shaped suction port the MRF can be drawn into the intermediate space 43 between the internal toothing 13 and the external toothing 11. For this purpose, the MRF drawn in through the kidney-shaped suction port 26a flows from the pressure side 27 through the damping channel 17 or the partial segments thereof to the suction side 26. The damping channel 17 extends in this case over (almost) the entire outer circumference of the outer displacement component 5. It is possible, for example, for the narrow segments of the guide units 21 to be omitted over the entire circumference.

The kidney-shaped suction port 26a and the kidney-shaped pressure port 27a formed in the other end region on the other face side extend in each case in approximately kidney-shaped fashion over an angle range of <180°, as is conventional in the case of toothed-ring pumps or gerotor pumps. The circumferential groove 50 and the kidney-shaped suction port 26*a* together form a supply channel, whereas the circumferential groove 51 and the kidney-shaped pressure port 27*a* together form a discharge channel.

The collecting groove 50 on the suction side and the collecting groove 51 collect the MRF on the suction side, and discharge said MRF on the pressure side, over the entire circumference. "Crosstalk", or a fluid short-circuit, is prevented by virtue of the collecting grooves 50 and 51 being arranged on different face sides, such that the suction and pressure sides are in this case also axially separated from one another. In the region of the kidney-shaped suction port and of the kidney-shaped pressure port, the illustration of which can be obtained by horizontal mirroring of FIG. 3*b*, the MRF is respectively collected and distributed. The collecting groove 51 may also be referred to as distributing groove 51.

The kidney-shaped suction and pressure ports may also be provided on the same face side, wherein then, it is necessary to dispense with (fully encircling) collecting grooves 50 and 51, because otherwise a fluid short circuit would arise. The collecting grooves need not extend over the full circumference. This also applies to the damping channel 17.

FIG. 4 shows an exploded illustration of the rotary damper 1 in section, wherein the in this case left-hand housing part with the first end region 22 and also the first displacement component 4 and the second displacement component 5 are illustrated in an arrangement in which they are in each case slightly axially offset, in order to provide better understanding of the technical function.

The damper shaft 3 is in this case formed in one piece with the first displacement component 4, which on its outer circumference has an external toothing 11 which meshes with an internal toothing 13 in the interior of the second displacement component 5. The second displacement component 5 is radially surrounded by a damping channel 17 through which the magnetorheological fluid, which in this case has been conveyed through in the interior of the second displacement component 5, can flow back to the axially other side.

Here, the control device 7 is depicted on the outside of the housing 12, which control device can be supplied with the required electrical current by means of an energy store 37 or accumulator or the like, even if an electrical connection to the on-board electrical system of the passenger transport means fails.

An equalization volume 29 always available in order to provide volume equalization in the presence of different temperatures. The equalization volume 29 may comprise a compressible mass or a compressible gas bladder in order to provide volume equalization for different temperatures.

The damper shaft 3 is mounted by means of a bearing 44. The axis of rotation 14 of the first displacement component 4 corresponds to the axis of rotation of the damper shaft 3. The axis of rotation 15 of the second displacement component 5 is offset in parallel with respect thereto.

Figure 5:
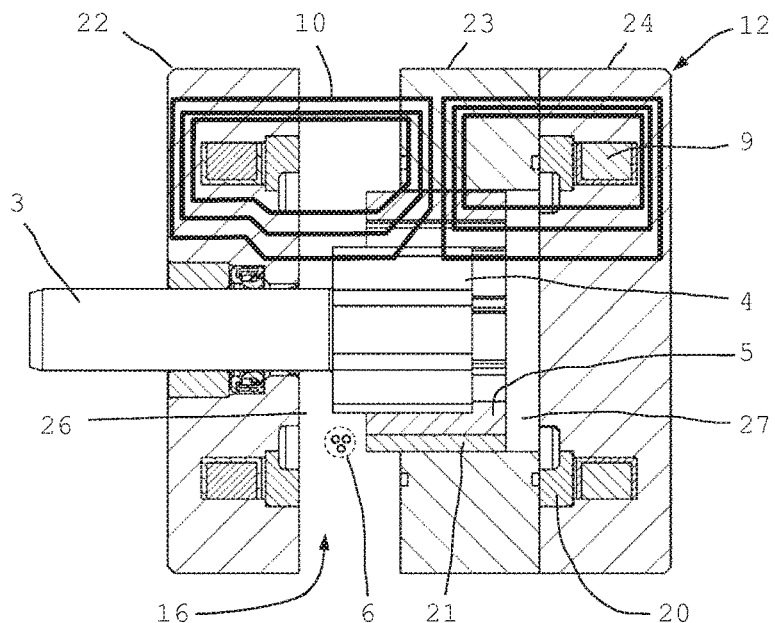
FIG. 5 shows the illustration as per FIG. 4 with magnetic field lines plotted.

FIG. 5 shows an illustration similar to FIG. 4, but with some magnetic field lines of the magnetic field 10 plotted by way of example. The magnetic field lines run in each case through an end region and the central region 23 of the housing 12 and traverse the damping gap 18 (cf. FIG. 6) between the housing 12 and the second displacement component 5 approximately radially and then pass from the second displacement component 5 into the first displacement component 4. From there, the magnetic field lines traverse the axial gap 25 (cf. FIG. 6) between the first or second displacement component 4, 5 and the respective end region 22, 24, resulting in closed magnetic field lines. Here, in each case one electrical coil in in each case one end region 22, 24 generates magnetic fields which seal both the radial gap between the displacement components and the two axial face-side axial gaps 25.

By virtue of the fact that an electrical coil 9 is provided in each end region of the housing 12 and by virtue of the fact that the electrical coils 9 extend over the circumference of the respective end region, practically every gap between the displacement components 4, 5 and between the displacement components 4, 5 and the housing 12 has the magnetic field 10 of the magnetic field source 8 applied thereto. As a result, the magnetorheological particles of the magnetorheological fluid 6 present in the interior space 16 of the rotary damper 1 or of the housing 12 interlink with one another, wherein the intensity of the interlinking is dependent on the intensity of the acting magnetic field 10.

By means of the magnetically non-conductive rings 20, which altogether have a relative permeability of less than ten, a magnetic short-circuit in the respective end regions 22, 24 is reliably prevented. It is also possible for one end region (or both) to be composed of two or more parts or sections. Here, the section adjoining the displacement components 4, 5 preferably exhibits better magnetic conductivity than the magnetically non-conductive ring. The adjoining section (or the entire end region) preferably has a relative permeability of greater than ten and in particular greater than 100 and preferably greater than 1000.

Figure 6:
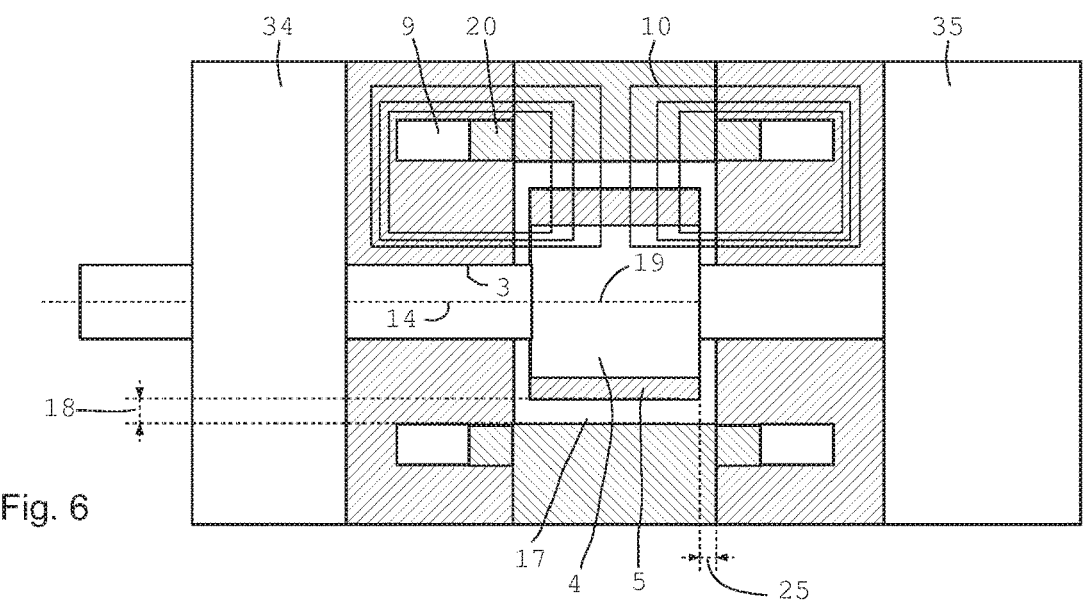
FIG. 6 shows a further rotary damper for an apparatus according to the invention in a schematic section.

FIG. 6 shows a slightly modified embodiment in a schematically sectioned illustration, wherein the spacings and gaps 18, 25 are in this case illustrated on an enlarged scale in order to be able to make them actually visible at the illustrated scale. Here, the rotary damper 1 optionally has an electric motor 35 at the second end region 24. For this purpose, it is possible for the damper shaft to extend all the way through the rotary damper 1, such that the electric motor 35 is coupled thereto. Here, an auxiliary gearing 34 may be connected upstream on the side of the first end region 22.

It is possible to clearly see the axial gap 25 and the radial gap 18 between the displacement components 4, 5 and the end regions 22, 24, and between the second component 5 and the housing 12 in a radial direction, respectively. In reality, the radial gap 18 is preferably approximately 2 to 4 times and in particular approximately three times as large as the axial gap 25. In physical embodiments, an axial gap 25 of approximately 0.03 mm and a radial gap of approximately up to 0.3 mm have proven to be expedient.

Figure 7:
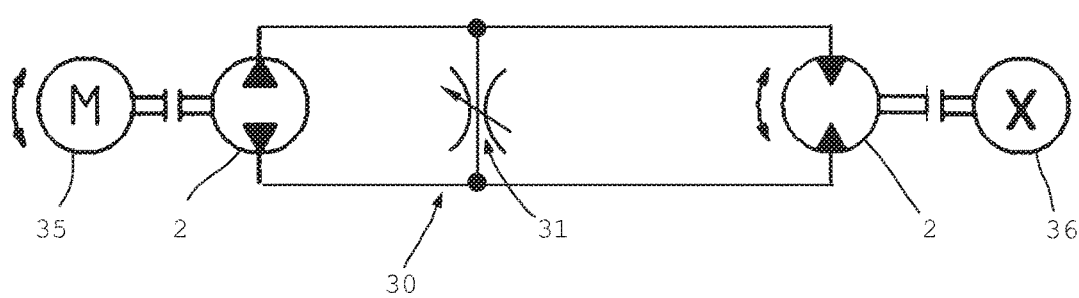
FIG. 7 shows a further exemplary embodiment of an apparatus according to the invention in a schematic illustration.

Finally, FIG. 7 shows, in a highly schematic illustration, an exemplary embodiment in which an electric motor 35 and an actuator 36 may be provided. Here, the apparatus 100 comprises two displacement devices 2 and at least one external valve 30 with a valve channel 31 as damping channel. In this embodiment, it is possible that the individual displacement devices 2 have no explicit damping channel, with rather only the damping channel 31 at the external damping valve 30 being provided. The magnetic field of the magnetic field source 8 then acts at said damping channel also. In this embodiment, it is possible for the actuator, which is designed in particular as a rotary unit, to be rotated. The direction of rotation of the electric motor 35 can be changed in order to set anticlockwise or clockwise movement of the actuator. In this way, the safety belt can also be wound up.

LIST OF REFERENCE DESIGNATIONS

1 Rotary damper
2 Displacement device

3 Damper shaft
4 Displacement component
5 Displacement component
6 Magnetorheological fluid
7 Control device
8 Magnetic field source
9 Electrical coil
10 Magnetic field
11 External toothing of 4
12 Housing of 2
13 Internal toothing of 5
14 Axis of rotation of 4
15 Axis of rotation of 5
16 Interior space of 2
17 Damping channel
18 Damping gap
19 Axis of 9
20 Ring in 12
21 Guide unit
22 First end region
23 Central region
24 Second end region
25 Axial gap
26 Inlet, suction side
26a Kidney-shaped suction port
27 Outlet, pressure side
27a Kidney-shaped pressure port
28 Seal on 3
29 Equalization volume
30 Damping valve
31 Valve channel
32 Angle sensor
33 Load sensor
34 Auxiliary gearing
35 Electric motor
36 Actuator
37 Energy store
38 Coil holder
39 Permanent magnet
42 Seal of 23
43 Intermediate space
44 Bearing
50 Collecting groove
51 Collecting groove
100 Apparatus
101 Safety belt
102 Belt roller
103 Clutch
200 Passenger transport means
201 Occupant sensor

The invention claimed is:

1. An apparatus for influencing the force of a safety belt on an occupant of a vehicle, the apparatus comprising:
a rotary damper having a housing, a damper shaft at least partially disposed in said housing, and magneto-rheological fluid being a working fluid for damping a rotational movement of said damper shaft during a winding-up or unwinding of the safety belt;
said rotary damper having a displacement device with displacement components that engage into one another, are mounted for co-rotation together with said damper shaft and rotation relative to said housing, and which are wetted by the magnetorheological fluid;
a magnetic field source with at least two electric coils for generating a magnetic field, said at least two electric coils being disposed to cause a major portion of the magnetic field to permeate an axial gap formed between said housing and at least one of said displacement components, and to influence a resistance of said displacement components and said damper shaft against a rotation thereof relative to said housing; and
a control device configured to control the magnetic field of the magnetic field source and to thereby influence the magnetorheological fluid and to adjust a degree of damping of the rotational movement of said damper shaft.

2. The apparatus according to claim 1, wherein:
said displacement components include a first displacement component fixedly connected to said damper shaft and a second displacement component rotatably mounted in said housing of said displacement device; and
said first displacement component is in engagement with said second displacement component and is disposed eccentrically with respect to said second displacement component.

3. The apparatus according to the claim 2, wherein said first displacement component has an external toothing, said second displacement component has an internal toothing, and said second displacement component is mounted for rotation in said housing.

4. The apparatus according to claim 1, wherein said rotary damper is formed with at least one damping channel to be exposed to the magnetic field of said magnetic field source.

5. The apparatus according to claim 2, wherein said rotary damper is formed with a damping gap radially between said second displacement component and said housing, said damping gap forming a damping channel to be exposed to the magnetic field of said magnetic field source.

6. The apparatus according to claim 5, wherein said damping gap is to be exposed to a major portion of the magnetic field of said magnetic field source.

7. The apparatus according to claim 2, which comprises a multiplicity of guide units disposed to rotatably guide said second displacement component in said housing and to ensure a defined damping gap between said second displacement component and said housing.

8. The apparatus according to claim 2, wherein:
said housing comprises first and second end regions and a central region in between said first and second end regions;
said at least one electrical coil is accommodated in at least one of said first and second end regions, and an axis of said coil extends substantially parallel to said damper shaft.

9. The apparatus according to claim 2, wherein said housing is composed, at least to a major extent, of a magnetically conductive material with a relative permeability of greater than 100.

10. The apparatus according to claim 2, which comprises a ring composed of a material with a relative permeability of less than 10 disposed axially adjacent said electrical coil in said housing, said ring being arranged axially between said electrical coil and said displacement components.

11. The apparatus according to claim 2, wherein a major part of the magnetic field of said magnetic field source passes through an axial gap between said housing and the displacement components.

12. The apparatus according to claim 1, wherein said displacement device has an inlet and an outlet, and the magnetorheological fluid can be conveyed from said inlet to said outlet by the rotational movement of said displacement components that mesh with one another.

13. The apparatus according to claim 12, wherein said inlet and said outlet are formed on mutually different axial sides of said displacement device.

14. The apparatus according to claim 12, wherein said magnetic field source is configured to establish the magnetic field to be weaker in a region of said inlet than in a region of said outlet.

15. The apparatus according to claim 1, which comprises a belt roller and a clutch device functionally arranged between said rotary damper and said belt roller.

16. The apparatus according to claim 1, which comprises an equalization volume for permitting a temperature equalization.

17. The apparatus according to claim 1, which comprises at least one external damping valve with a valve channel forming a damping channel.

18. The apparatus according to claim 1, which comprises an angle sensor configured to detect a value for an angular position of said damper shaft.

19. The apparatus according to claim 1, which comprises an electric motor coupled to said rotary damper for at least one of unwinding or winding the safety belt.

20. The apparatus according to claim 1, which comprises at least one external actuator fluidically connected to said displacement device.

21. The apparatus according to claim 1, which comprises an occupant sensor for detecting at least one occupant-related measurement variable selected from the group consisting of a position, a weight, a physical build and an age of an occupant, and wherein said control device is configured to control said rotary damper in dependence on said at least one measurement variable.

22. A method for influencing a force of a safety belt on an occupant of a passenger vehicle, the method comprising:
  providing a rotary damper with a magnetorheological fluid being a working fluid in a damping channel formed between a housing and a rotatable displacement device mounted for co-rotation with a damper shaft, the rotary damper being effective to exert a torque opposing a rotation of the damper shaft relative to the housing;
  providing a magnetic field source with at least two coils disposed to generate a magnetic field that is effective in the damping channel;
  determining a value for a load exerted on the occupant by the safety belt;
  subsequently, in dependence on the value for the load, adjusting the magnetic field of the magnetic field source effective in the damping channel of the rotary damper in order to dampen a rotational movement of the damper shaft during a winding-up or unwinding of the safety belt;
  arranging and driving the magnetic field source to expose an interior space of the rotary damper to a major portion of the magnetic field generated by the magnetic field source.

* * * * *